Aug. 27, 1929.  F. H. GLEASON ET AL  1,726,484
HYDRAULIC BRAKE
Filed June 3, 1924
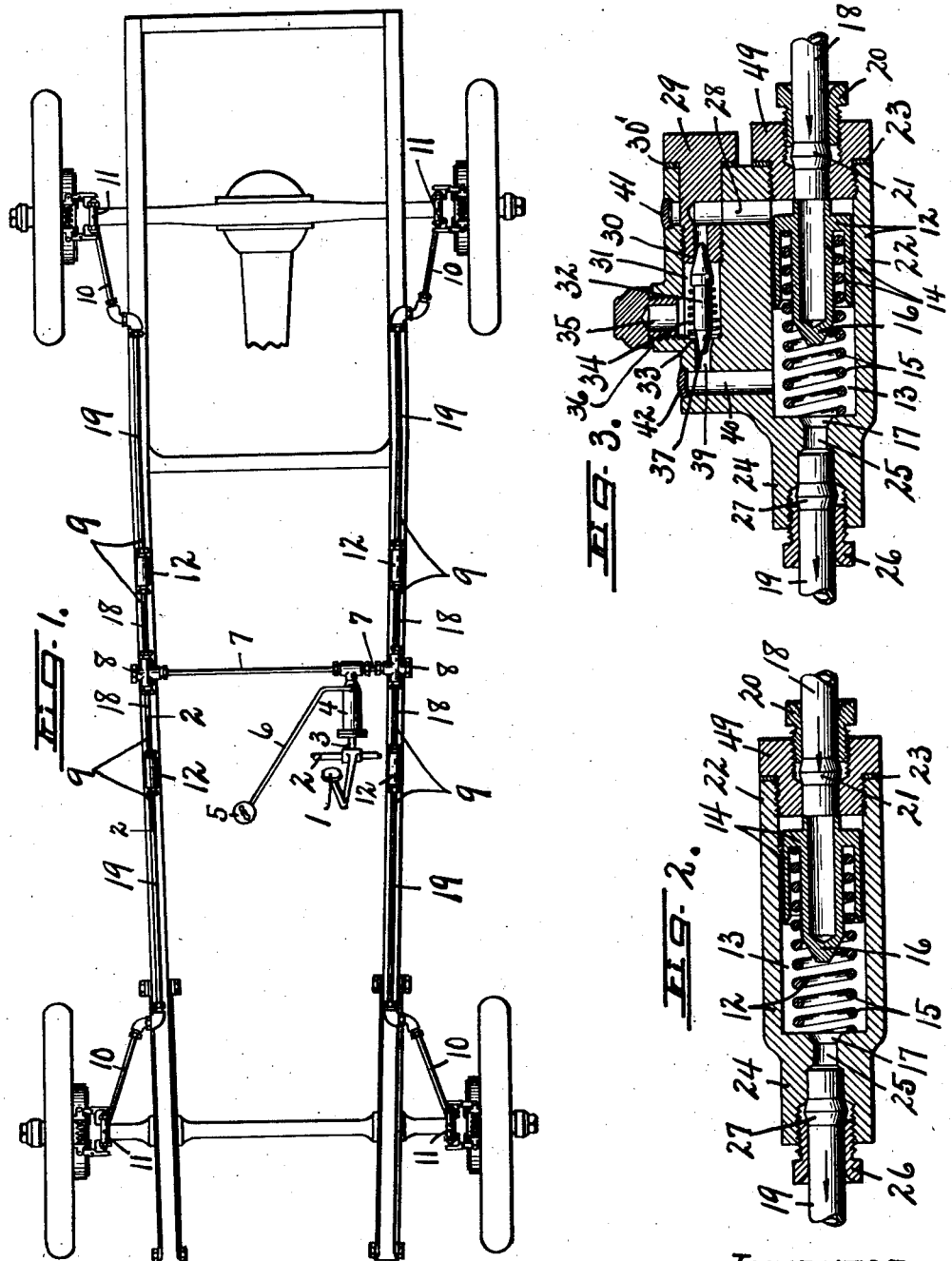
INVENTOR
F. H. Gleason and
BY L. F. Goodspeed Patented Aug. 27, 1929.

1,726,484

UNITED STATES PATENT OFFICE.

FREDERICK H. GLEASON, OF AUBURN, NEW YORK, AND LELAND F. GOODSPEED, OF KALAMAZOO, MICHIGAN, ASSIGNORS TO BOWEN PRODUCTS CORPORATION, OF AUBURN, NEW YORK, A CORPORATION OF NEW YORK.

HYDRAULIC BRAKE.

Application filed June 3, 1924. Serial No. 717,589.

This invention relates to certain new and improved hydraulic brakes, and more specifically to a hydraulic brake system including safety devices, which safety devices are in themselves adapted for use with any hydraulic fluid-controlled or operating device as used for applying the brakes of an automobile chassis or controlling movements of the various parts of machine tools or other hydraulically-controlled devices, or locomotives, railway cars or trolley cars.

The hydraulic control system as applied to the brakes of an automobile chassis require two or more flexible tubes or connections extending from the chassis frame to the several brake-operating cylinders located at the ends of the contracting brake bands on the wheels of the vehicle. The travel of the brake pedal which operates the master cylinder, which in turn operates the brake-applying clinders through fluid pressure, is limited by the distance the operator's foot can conveniently travel, coupled with the pressure required per square inch to properly apply the necessary brake pressure through the brake-applying cylinders on the wheel brake-drum. A very small leak between the master cylinder and the brake-operating cylinder or cylinders will render the entire braking system inoperative.

For illustration, a car equipped with hydraulic brakes on all four wheels includes four flexible tubes extending from the chassis frame to the brake cylinders on the axle, and if any one of these tubes or connections breaks or develops any serious leak, pressing down on the brake pedal will not apply the brakes as the volume of fluid displaced by the foot brake operating pedal at the pressure required to operate the brake is strictly limited, and there is not enough travel to the brake pedal and the piston of the master cylinder to maintain pressure on the fluid.

A car traveling fifty miles an hour covers approximately 73⅓ feet per second, and if a driver, accustomed to the prompt stopping ability of a hydraulically operated brake system, should be driving at the above speed and one of the tubes connecting the master cylinder to the brake-applying cylinders should break when he operated the foot pedal to apply the brake he would obtain no braking action, and a considerable interval of time would pass and the car would travel a great distance before the operator could use other braking means to stop the car and avoid accident.

The main object of this invention, therefore, is the production of a hydraulically controlled system including a safety device installed in the main pressure fluid-operating tubes of the system, and which will automatically act to close off a tube which develops a leak, and thereby permit the hydraulic pressure to operate the remaining lines or the remaining brakes when used in a hydraulic brake system.

Other objects and advantages relate to the details of construction and operation of the safety device, all as will more fully appear from the following description, taken in connection with the accompanying drawings, in which:

Figure 1 illustrates an automobile chassis with hydraulically operated brakes on all four wheels.

Figure 2 is a longitudinal section on line 2—2 of Fig. 1, through a safety device of our invention for incorporating in a hydraulically-controlled system.

Figure 3 is a section similar to Figure 2 of a slightly modified form of safety device.

In a general way, the known hydraulic brake system comprises a brake pedal —1— in the form of a bell crank, preferably mounted in any suitable manner as upon the shaft —2—, and having its lower end connected to the piston rod —3— which actuates the piston in the master cylinder —4—. The master cylinder —4— and the remaining portions of the hydraulic system are maintained full of fluid taken from a small reservoir —5— connected to the master cylinder —4— by a tube —6— so that the reservoir supplies a small amount of fluid to the system each time the foot pedal is operated if the system is not entirely filled with fluid. From the master cylinder two supply lines —7— extend to the tubing T's —8— at opposite sides of the frame of the vehicle, and from the T's —8— tubes —9— extend to the flexible tubes —10— connected to the respective brake-applying cylinders —11— located on the outer ends of the axles of the chassis.

The construction above described is well known and used with present hydraulic braking systems.

Our invention contemplates the combination with the structure so far described of safety devices —12— installed in the hydraulic tubing lines —9— and which devices are automatically actuated by the pressure of the fluid to shut off any respective line when a break or leak occurs in that line so that the brakes operated by the lines intact will be actuated irrespective of the condition of any other of the tubing lines.

The device —12— installed in each of the lines —9— may take various forms so long as it automatically operates to cut off its respective line when the tubing line becomes broken or develops a leak.

As illustrated in Figure 2 the device —12— comprises a casing provided with a cylindrical bore —13— in which a loosely fitting piston —14— operates. The piston —14— is normally held against the inlet end of the cylindrical bore by a coil-spring —15— having one end bearing against the outlet end of the casing, and its other end seated in an annular recess in the piston —14—.

The piston —14— is further provided with a tapered projection —16— which is adapted to act as a valve and seat in the valve seat —17— when the piston —14— is at the left end of its travel i. e., when it has been forced by the pressure of fluid entering the bore —13— from the portion —18— of tube —9— longitudinally of the bore —13— against the action of spring —15— until the valve —16— contacts with the seat —17— formed at the outlet end of the bore —13— at which time communication between bore —13— and the portion —19— of tube —9— is cut off, and that condition will continue to exist until the pressure is released in the supply lines —7— and portion —18— of tube —9—.

The portion —18— of the tube —9— is attached to the tubing fitting —49— in any suitable manner, as by means of a tubing nut —20— and a tubing sleeve —21— of ordinary construction and the tubing fitting —49— is threaded into the inlet end of the casing —22— and is made fluid tight by means of a gasket —23—. The portion —19— of the tube —9—, and which leads onward to the flexible tube —10— is attached to casing —22— which is formed with a reduced end —24— and a contracted passageway —25— leading from bore —13— as by means of tubing nut —26— and tubing sleeve —27—.

The operation of this structure is as follows:—

The volume of fluid displaced by piston —14— on full stroke when the tapered projection —16— travels over and seats in valve seat —17— is slightly greater than the volume of fluid required to operate the usual pistons in the brake-operating cylinders —11— so that in normal operation when there is no break or leak in the tubes beyond the safety device, the piston —14— does not make a full stroke, and the tapered projection or valve —16— does not contact with the valve seat —17—.

In normal operation, the piston —14— is for all purposes a part of the operating fluid in the tubing line, and moves forward and back with the fluid when the piston in the master cylinder is operated, and the brake applied and disengaged. The piston —14— being a loose fit in the cylindrical bore —13— and being urged back toward the supply portion —18— of the tube —9— by spring —15—, every time the brake is operate a small amount of fluid is passed around the piston —14— due to its loose fit in bore —13— because the spring —15— urges the piston —14— backward faster than the fluid is moving back when the pressure is released from the portion —18— of tube —9— to release the brake.

The fluid thus passed by the loose fitting piston —14— keeps the tubes and brake-operating cylinders full of fluid.

The piston 14 being a loose fit in the cylinder bore 13, and its normal seat against the inlet end of the cylinder bore not being fluid tight, any excess fluid in the tubes and brake operating cylinders will pass by piston 14 to permit the full release of the brake.

Should there be a leak in the connection between the tubes —9— and —10— or between the tubes —10— and the brake-operating cylinders —11— or in the cylinders themselves, or a break in either of the tubes beyond the device —12—, the tapered projection —16— of the piston —14— in the respective line will seat in valve-seat —17— cutting off the flow of fluid to the portion —19— of tube —9—, the tube —11— and the respective brake-operating cylinders, but still permitting pressure to be applied to the other lines, including tubes —9— and —11— which are intact whereby the brakes will be applied on the three wheels, which include unbroken non-leaking lines with lack of braking only on the wheel which has a leak or broken connection in its line.

In Figure 3 a slightly different construction of device —9— is illustrated in that additional means is provided for maintaining the tubes beyond the device full of fluid at all times when the structure is in operating condition. As illustrated, the casing —22— is formed with a bore —13— in which a loosely fitting piston —14— is movable, the piston being normally held at the inlet end of the bore —13— by spring —15—, and being provided with a tapered projection —16— constituting a valve adapted to seat in valve seat —17— in like manner, as hereinbefore described with respect to Figure 2, and the connection of the portions —18— and —19— of tube —9— to the casing —22— are effected in the same manner as described in connection with Figure 2.

The additional structure consists in an upward extension of the casing —22— which is provided with an upwardly extending passage —28— at the front or on the pressure side of piston —14— and this passageway extends through a threaded plug —29— attached to casing —22— by a threaded relation and made fluid-tight by gasket —30'—. The inner end of plug —29— is formed with a valve seat —30— at one end of a chamber or passageway —31— formed in the upper portion of casing —22—. A double ended valve —32— tapered in opposite directions at its opposite ends is movable in the passage —31— between the valve seat —30— and a valve-seat —33— formed at the opposite end of the passageway. The valve —32— is normally held with one of its tapered valve ends in contact with the seat —30— in any suitable manner as by a spring —34— coiled about the valve, and having one end contacting with a shouldered portion of the valve and its other end in contact with the wall or chamber of the passage —31—.

An air-control chamber —35— is attached to casing —22— by a threaded relation between the parts, the joint being sealed by means of gasket —36— and this air control chamber is disposed above the passage —31— and is in open communication therewith. The tapered valve end —37— is adapted to seat against the valve seat —33— formed at the outlet end of the passageway —31— and close communication between the passageway and an outlet conduit —39— leading to a vertical passageway —40— through the casing —22— which communicates with the bore —13— near the outlet end thereof. The drilled passageways —28— and —40— may have their upper ends closed in any suitable manner as by expansion plugs —41— and —42—.

The operation of the device shown in Figure 3 is similar to that described in connection with the structure of Figure 2 except that a different or additional means is provided to maintain the tube parts beyond the device —12— and the brake operating cylinders full of fluid. Every time the master cylinder is actuated to operate the brakes by applying fluid pressure through portions —18— of tubes —9—, fluid under pressure is forced through passageway —28— and against the tapered end of valve —32— in contact with the seat —30— whereby the tapered double ended valve —32— is forced longitudinally of passageway —31— into contact with seat —33— and closes the passageway —39— which is in communication with the cylindrical bore —13— through the medium of passageway —40—.

The pressure on the fluid in the passageway —31— causes the fluid to compress the air in the air-control chamber —35— and the air chamber fills with fluid backed up by air under pressure. When the brake is released by reducing pressure in portion —18— of tube —9—, valve —32— under the urge of spring —34— moves longitudinally of passageway —31— and seats against the seat —30—, thereby opening communication between air chamber —35— and bore —13— and if the tubes beyond the device —12— and the brake-applying cylinders are not filled with fluid, fluid is forced from air-chamber —35— by the air under pressure into the bore —13—, portions —19— of tubes —9—, the tubes —10— and the brake-applying cylinders —11— to thereby maintain those portions of the system full of fluid.

Altho we have shown and described specific devices as constituting perhaps preferred embodiments of our invention we do not desire to restrict ourselves to the details of construction or operation of such device in the combination described, as various structures accomplishing the broad objects of our invention may be made without departing from the invention as set forth in the appended claims.

I claim:

1. In a hydraulic control system, a valve chamber in said system, a piston arranged in said chamber, a by-pass around the piston for supplying fluid to the portion of the system beyond the piston and a valve in said by-pass automatically actuated by the pressure of the fluid in the system for controlling the flow of the fluid therethrough.

2. In a hydraulic control system, a valve chamber in said system, a piston arranged in said chamber, and a by-pass around the piston for supplying fluid to the portion of the system beyond the piston when the compression has been released.

3. In a hydraulic control system, a valve chamber in said system, a piston arranged in said chamber, a by-pass around the piston for supplying fluid to the portion of the system beyond the piston, said by-pass including an air chamber adapted to receive fluid backed up by air under pressure and supply the said fluid to the portion of said system beyond the piston when the compression in the system has been released.

4. In a hydraulic control system, a valve chamber in said system, a piston arranged in said chamber, a by-pass around the piston for supplying fluid to the portion of the system beyond the piston, said by-pass including an air chamber and oppositely tapered connected valves controlling communication of the air chamber with the valve chamber upon opposite sides of said valve, said air chamber adapted to receive fluid backed up by air under pressure, and supply the same to the portion of said system beyond said piston when the pressure in the system has been released.

5. In a hydraulic controlled system a piston chamber in said system, a piston arranged in said chamber, a conduit in the system by-passing the piston, and a valve in said conduit actuated by the pressure of the fluid in the system to control the supply of fluid to the portion of the system beyond the valve.

6. In a hydraulic controlled system, a piston chamber in said system, a piston arranged in said chamber, a conduit in the system by-passing the piston, a valve in said conduit actuated by the pressure of the fluid in the system to control the supply of fluid to the portion of the system beyond the valve, and an air chamber in connection with said conduit.

7. In a hydraulic control system, a valve chamber arranged in said system and having a valve seat at one end, a valve disposed in said chamber and having a cylindrical guide member at one end, said guide member having an annular recess and said valve extending outwardly from such recess, and a spring disposed in said annular recess and around said valve to normally hold the latter off the valve seat.

In witness whereof we have hereunto set our hands this 14th day of May, 1924.

FREDERICK H. GLEASON.
LELAND F. GOODSPEED.